(12) United States Patent
Pierre et al.

(10) Patent No.: US 8,996,205 B2
(45) Date of Patent: Mar. 31, 2015

(54) METHOD FOR REGULATING THE TORQUE OF A CONTROL SURFACE ACTUATOR WITH A CONTROLLED ANGULAR POSITION ON AN AIRCRAFT WITH MECHANICAL FLIGHT CONTROL

(71) Applicant: Thales, Neuilly-sur-Seine (FR)

(72) Inventors: Romain Pierre, Toulouse (FR); Arnaud Bonnaffoux, Toulouse (FR); Caroline Adamski, Toulouse (FR)

(73) Assignee: Thales, Courbevoie (FR)

( * ) Notice: Subject to any disclaimer, the term of this patent is extended or adjusted under 35 U.S.C. 154(b) by 63 days.

(21) Appl. No.: 13/949,067

(22) Filed: Jul. 23, 2013

(65) Prior Publication Data

US 2014/0163783 A1 Jun. 12, 2014

(30) Foreign Application Priority Data

Jul. 27, 2012 (FR) ...................................... 12 02129

(51) Int. Cl.
*B64C 13/18* (2006.01)
*G05D 1/00* (2006.01)

(52) U.S. Cl.
CPC .............. *B64C 13/18* (2013.01); *G05D 1/0066* (2013.01)
USPC .............. 701/11; 701/14; 244/174; 244/76 A; 244/99.2; 244/99.9; 244/197

(58) Field of Classification Search
None
See application file for complete search history.

(56) References Cited

U.S. PATENT DOCUMENTS

| | | | | |
|---|---|---|---|---|
| 4,209,734 A * | 6/1980 | Osder | ........................... | 318/564 |
| 5,797,105 A * | 8/1998 | Nakaya et al. | ..................... | 701/7 |
| 5,908,177 A * | 6/1999 | Tanaka | ........................... | 244/223 |
| 5,950,774 A * | 9/1999 | Lang et al. | ..................... | 188/134 |
| 6,260,795 B1 * | 7/2001 | Gay et al. | ........................ | 244/16 |
| 8,418,966 B2 * | 4/2013 | Hetrick et al. | ................ | 244/214 |
| 8,534,611 B1 * | 9/2013 | Pitt et al. | ........................ | 244/214 |
| 8,718,839 B2 * | 5/2014 | Everett et al. | ..................... | 701/3 |
| 8,812,178 B2 * | 8/2014 | Meret et al. | ........................ | 701/3 |
| 2003/0183728 A1 * | 10/2003 | Huynh | ........................ | 244/224 |
| 2004/0238688 A1 * | 12/2004 | Audren | ....................... | 244/75 R |
| 2005/0178897 A1 * | 8/2005 | Moreno | ....................... | 244/75 R |
| 2005/0252318 A1 * | 11/2005 | Corney | ........................ | 74/89.23 |
| 2007/0018039 A1 * | 1/2007 | Hillen et al. | ................ | 244/99.2 |
| 2009/0090816 A1 * | 4/2009 | Gomes | ........................ | 244/234 |
| 2009/0157238 A1 * | 6/2009 | Le Bastard et al. | .............. | 701/4 |
| 2009/0292405 A1 * | 11/2009 | Najmabadi et al. | .............. | 701/3 |
| 2010/0024580 A1 * | 2/2010 | Hadley et al. | ................ | 74/89.26 |
| 2010/0078518 A1 * | 4/2010 | Tran et al. | ....................... | 244/87 |
| 2011/0024551 A1 * | 2/2011 | Biest et al. | ........................ | 244/6 |
| 2011/0137496 A1 * | 6/2011 | Everett et al. | ..................... | 701/3 |
| 2012/0267473 A1 * | 10/2012 | Tao et al. | ......................... | 244/38 |
| 2013/0345907 A1 * | 12/2013 | Meret et al. | ........................ | 701/3 |
| 2014/0163783 A1 * | 6/2014 | Pierre et al. | ..................... | 701/11 |
| 2014/0288731 A1 * | 9/2014 | Hagerott et al. | .................. | 701/3 |

* cited by examiner

*Primary Examiner* — Thomas Tarcza
*Assistant Examiner* — Richard Goldman
(74) *Attorney, Agent, or Firm* — Baker Hostetler LLP

(57) ABSTRACT

A method for regulating an actuator for a control surface is provided, which actuator has an angular position controlled by an autopilot on an aircraft with mechanical flight control. When the value of the torque exerted by the actuator is less than a threshold torque value, the actuator is regulated in terms of position and the maximum speed of movement of the control surface is limited to a value that is dependent on the torque value. When the value of the torque exerted by the actuator is greater than the threshold torque value, the actuator is regulated in terms of torque.

6 Claims, 5 Drawing Sheets

METHOD FOR REGULATING THE TORQUE OF A CONTROL SURFACE ACTUATOR WITH A CONTROLLED ANGULAR POSITION ON AN AIRCRAFT WITH MECHANICAL FLIGHT CONTROL

CROSS-REFERENCE TO RELATED APPLICATION

This application claims priority to foreign French patent application No. FR 1202129, filed on Jul. 27, 2012, the disclosure of which is incorporated by reference in its entirety.

FIELD OF THE INVENTION

The field of the invention concerns the regulation of a control surface actuator, said control surface being controlled by the autopilot of an aircraft with mechanical flight control.

BACKGROUND

Flight controls are systems linking the pilot or autopilot module and the control surfaces that allow the trajectory of the aircraft to be modified. Flight controls notably comprise a steering element such as a joystick and a mechanical system for actuating the control surfaces. In this case, the mechanical system comprises an actuator, the actuator being an electric motor of rotary type generating a torque which compensates for the torque exerted on the control surface by external forces of aerodynamic type.

The certification authorities stipulate that the pilot must be able to override the actuator of the autopilot module at any time, in other words the pilot must be able to regain manual control, in the event of failure of the autopilot PA, for example.

One solution consists in disengaging the actuator of the flight controls when the torque exerted by said actuator, in order to compensate for the torque exerted on the control surface by the external forces or by the pilot, is greater than the threshold torque value of the actuator.

This first solution presents a drawback, since the autopilot disengages, which gives rise to violent changes of trajectory which are unpleasant for the passengers and potentially dangerous when the aircraft is at low altitude.

Disengagement of the actuator when the control surface arrives at a limit stop constitutes another drawback. It is therefore necessary to provide safety margins involving a reduction in the angle difference for movement of the control surface, which diminishes the authority of the autopilot module PA.

One improvement consists in freezing the setpoint of the actuator when the torque exerted by the actuator on the control surface to compensate for the torque exerted on the control surface by the external forces reaches the threshold torque value. This solution seeks to avoid the disengagement of the actuator by no longer operating the control surface.

However, this solution does not take into account increases in the torque exerted by the actuator to compensate for the increases in the torque exerted on the control surface by the external forces for a constant position. For example, this solution does not take into account large increases in torque exerted on the control surface in the event of an engine failure or violent gusts of wind.

SUMMARY OF THE INVENTION

The solution proposed by the present invention consists in regulating the value of the torque exerted by the actuator to compensate for the torque exerted on the control surface by the external forces.

A method is proposed for regulating an actuator for a control surface, which actuator has a position controlled by an autopilot on an aircraft with mechanical flight control. The autopilot comprises a means for regulating the maximum speed of movement of the actuator. The method for regulating the actuator comprises:
   a first step of controlling a first setpoint angular position for the control surface using the autopilot, and
   a second step of measuring a torque exerted by the actuator on the control surface, compensating for the torque generated by external forces on the control surface, and
   a third step of regulating the actuator torque.
The third step comprises sub-steps consisting in:
   testing whether the torque exerted by the actuator lies between a first torque value and a second torque value, and in that case continuously regulating the maximum speed of movement of the control surface,
   testing whether the torque exerted by the actuator is equal to the second torque value, and in that case maintaining the speed of movement of the control surface at a nil value in such a way as to freeze the control surface.

The regulation of the speed of movement of the control surface makes it possible to avoid reaching torque values greater than the critical value beyond which there is a risk of disengaging the actuator.

According to one variant of the invention, a method is proposed as described previously in which the regulation of the maximum speed of movement of the control surface depends on the variations in the torque generated by the external forces.

For a given angular position, the regulation of the maximum speed of movement of the control surface makes it possible to avoid excessively rapid changes in the torque exerted on the control surface, which makes it possible to avoid exceeding the threshold torque value.

According to one variant of the invention, a method is proposed as described previously in which the maximum speed of movement of the control surface decreases when the torque exerted on the control surface by the external forces increases.

According to one variant of the invention, a method is proposed as described previously in which the third step also comprises a sub-step consisting in testing whether the torque exerted by the actuator is greater than the second torque value of the actuator, and in that case modifying the setpoint angular position of the control surface in such a way as to reduce the torque exerted by the actuator and bring it back down to the second torque value.

According to one variant of the invention, a method is proposed as described previously in which the third step comprises a sub-step which consists in testing whether the torque exerted by the actuator is less than the second value, and in that case regulating the setpoint angular position of the control surface in such a way as to deactivate the torque limitation.

According to one variant of the invention, a method is proposed as described previously in which the second step moreover comprises a step consisting in reducing the measurement noise for the torque exerted by the external forces on the control surface.

BRIEF DESCRIPTION OF THE DRAWINGS

The invention will be better understood on studying a few embodiments described using by no means limiting examples, and illustrated by appended drawings in which.

DETAILED DESCRIPTION

FIG. 1 show the operating principle of a control surface actuator regulated in terms of position on an aircraft with mechanical flight control.

Figure 1A:
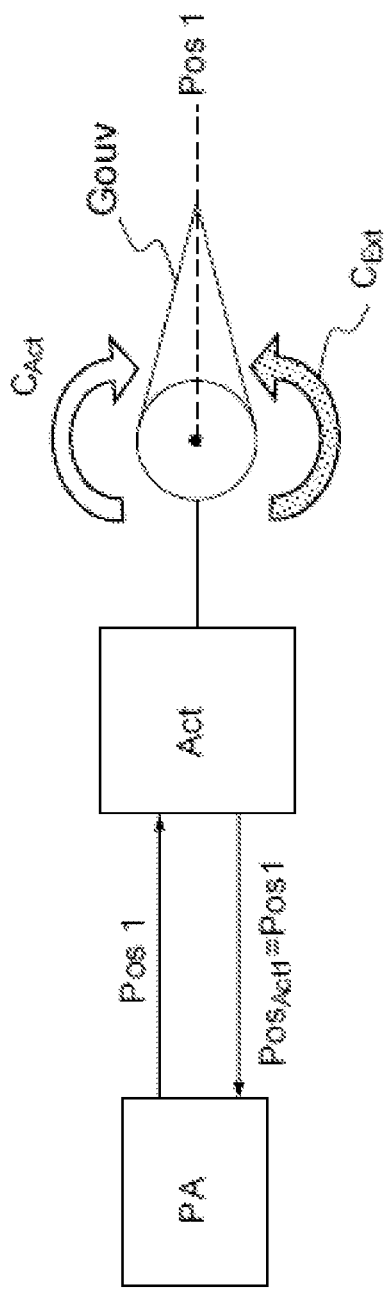
FIGS. 1A-1D show the main steps of operation of an actuator, according to the prior art.

FIG. 1A illustrates an autopilot module PA, an actuator Act comprising a position control loop and a control surface Gouv. The autopilot module PA orders a first setpoint angular position Pos1 for the actuator, making it possible to follow a direction of the aircraft. The control surface Gouv is then moved by the actuator Act. In this case, the first setpoint angular position Pos1 corresponds to a nominal position of the control surface Gouv, defined previously, i.e. during configuration of the autopilot module PA.

A torque $C_{Ext}$, represented by a shaded arrow, is exerted on the control surface Gouv by external forces. The external forces are generally aerodynamic forces. A torque $C_{Act}$, represented by a white arrow, exerted by the actuator Act compensates for the torque due to the external forces, which makes it possible to maintain the direction set by the autopilot module.

Sometimes, large variations in the external forces may be observed; these variations may be generated by strong gusts of wind or engine failure, for example. To comply with the setpoint angular position Pos1 controlled by the autopilot module PA, the actuator Act which directs the control surface Gouv exerts a larger torque $C_{Act}$ which compensates for the increases in torque $C_{Ext}$ that are exerted on the control surface Gouv by the external forces.

This system of compensating for the variations in the torque exerted by the control surface Gouv makes it possible to maintain the orientation of the control surface controlled by the autopilot module PA. The current first position $Pos_{Act1}$ of the control surface is equal to the setpoint angular position Pos1.

Figure 1B:
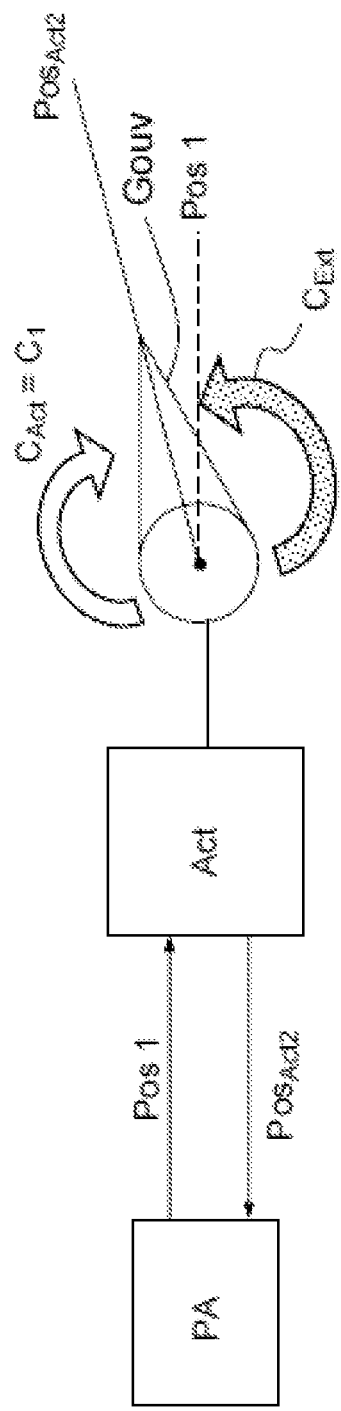

FIG. 1B shows the autopilot module PA, the actuator Act and the control surface Gouv. The setpoint angular position controlled by the piloting module PA is identical to the setpoint angular position Pos1 controlled by the piloting module in the case of FIG. 1a. In other words, the setpoint angular position Pos1 corresponds to the nominal position of the control surface Gouv. The external forces exert a torque $C_{Ext}$ even larger than previously. In an attempt to make up for the increase in the torque $C_{Ext}$, the actuator Act generates an even larger torque $C_{Act}$ until a first torque value $C_1$ is reached. The first torque value $C_1$ corresponds to a use limit for the actuator Act. Prolonged use of the actuator Act above this limit value risks leading to the disengagement of the actuator Act to meet the stipulations of the certifying authorities. In order to avoid disengagement of the actuator Act by further increasing the value of the torque $C_{Act}$ in such a way that it compensates for the increase in the torque $C_{Ext}$ exerted by the external forces on the control surface Gouv, the control surface is then frozen by means of a fixed positional setpoint. In spite of the increase in the torque $C_{Act}$ up to the first value $C_1$, the orientation of the control surface Gouv does not comply with the fixed setpoint angular position Pos 1 controlled by the autopilot PA, the torque $C_{Ext}$ generated by the external forces on the control surface Gouv being too large. In this case, the control surface reaches a second current position $Pos_{Act2}$ that is different from the setpoint angular position Pos1. The angle difference between the second current angular position $Pos_{Act2}$ and the first setpoint angular position Pos1 is less than a threshold angle difference $Pos_{seuil}$, fixed previously, for position monitoring, beyond which the actuator Act is disengaged from the flight controls.

Figure 1C:
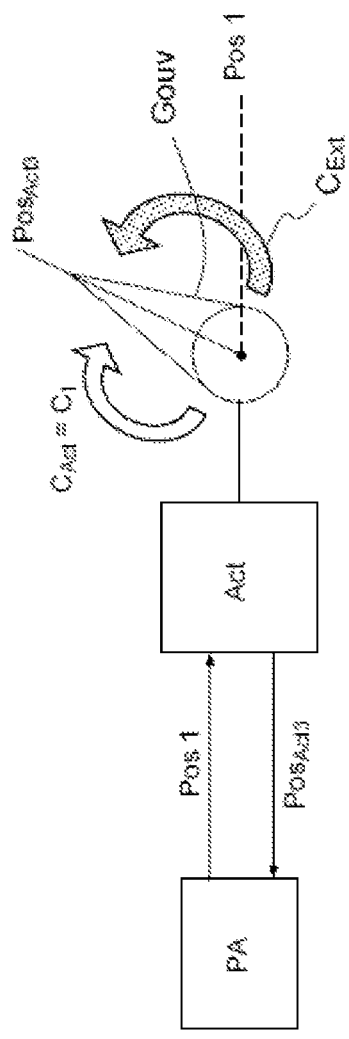

FIG. 1C presents the solution proposed by the prior art when the torque $C_{Ext}$ exerted by the external forces increases further. The torque $C_{Act}$ exerted by the actuator Act being fixed at a value $C_1$, the second current angular position $Pos_{Act2}$ of the control surface Gouv differs even further from the setpoint angular position Pos1, and the control surface Gouv reaches a third current position $Pos_{Act3}$. When the angle difference between the setpoint angular position Pos1 and the third current angular position $Pos_{Act3}$ is greater than a threshold angle difference $Pos_{seuil}$, fixed previously, for position monitoring, the autopilot module PA disengages the actuator Act from the flight controls.

Figure 1D:
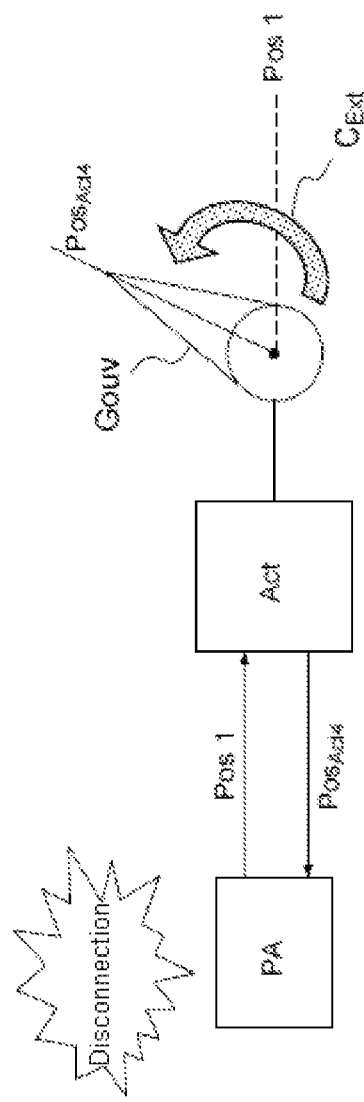

FIG. 1D shows the control surface Gouv when the actuator Act is disengaged from the flight controls. The torque $C_{Ext}$ exerted by the external forces on the control surface Gouv is no longer compensated for by the torque $C_{Act}$ of the actuator Act. The control surface Gouv is only subject to the torque $C_{Ext}$ and deflects rapidly, which leads to a very rapid change of direction. This change of direction can be potentially dangerous at low altitude. Usually, in this type of situation, the autopilot module PA disengages, which is not at all desirable in a situation in which directional control of the aircraft is crucial.

Figure 2:
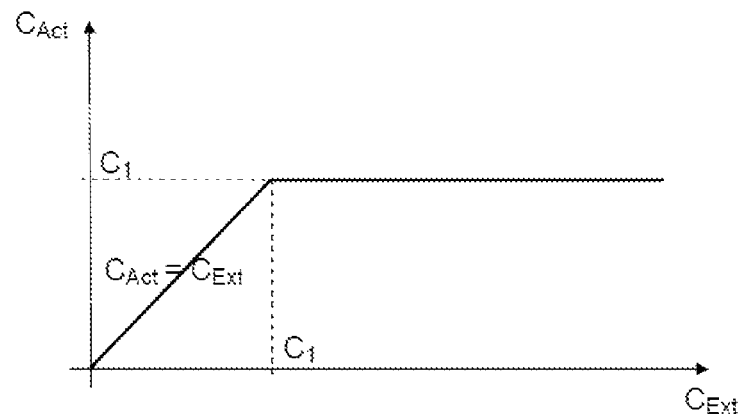
FIG. 2 shows the change in the value of torque exerted by the actuator as a function of the value of the torque exerted by the external forces, according to the prior art.

FIG. 2 shows a diagram illustrating the change in the torque $C_{Act}$ exerted by the actuator Act as a function of the external torque, according to the prior art. The actuator Act is regulated in terms of position only, and the autopilot module PA controls a setpoint angular position Pos1.

The actuator Act exerts a torque $C_{Act}$ making it possible to compensate for the torque $C_{Ext}$ exerted by the external forces on the control surface Gouv. Notably in the event of a violent puff of wind, the torque exerted by the external forces on the control surface Gouv increases. The actuator then compensates for this increase by increasing the torque $C_{Act}$. The increase in the torque $C_{Act}$ is, however, limited to a value $C_1$. The torque valve $C_1$ corresponds to the use limit of the actuator Act. At this torque value $C_1$, the control surface Gouv is frozen. If the torque $C_{Ext}$ exerted by the external forces continues to increase, so the angle difference between the setpoint angular position Pos1 and the current angular position is greater than a previously fixed threshold angle difference $Pos_{seuil}$, the threshold of position monitoring, the actuator Act is disengaged from the control surface Gouv in such a way as to avoid damaging it.

Figure 3:
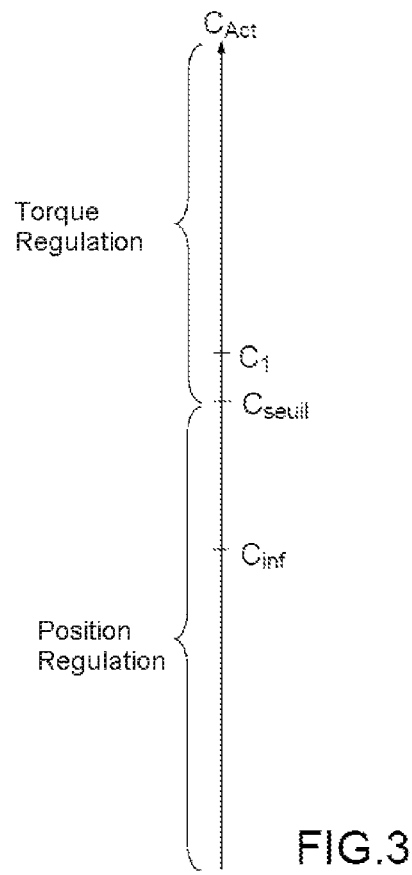
FIG. 3 shows an axis of the values of torque exerted by the actuator on the control surface, according to one aspect of the invention.

FIG. 3 shows an axis illustrating various values of torque $C_{Act}$ exerted by the actuator Act, according to one aspect of the invention.

The axis presents a first torque value $C_{Act}$, referred to as $C_{inf}$. Below this first torque value, the actuator Act is regulated in terms of position and the maximum speed of movement of the actuator is limited to a first value $v_0$. When the torque $C_{Ext}$ exerted by the external forces on the control surface Gouv is less than the torque value $C_{inf}$, the speed of movement of the control surface is limited to a first value $v_0$.

The axis presents a second torque value $C_{seuil}$, the torque value $C_{seuil}$ corresponding to the use limit of the actuator Act.

In the torque range between $C_{inf}$ and $C_{seuil}$, the maximum speed of movement of the control surface Gouv is decreased continuously as the torque $C_{Act}$ increases, i.e. as the torque exerted by the external forces on the control surface Gouv increases. When the torque $C_{Act}$ reaches the limit value $C_{seuil}$, the speed of movement of the control surface is fixed at 0 deg/s$^{-1}$, and the control surface positional setpoint is then fixed.

If the torque $C_{Ext}$ exerted by the external forces on the control surface Gouv continues to increase, the autopilot module PA controls a second setpoint angular position Pos2 in such a way as to maintain the torque $C_{Act}$ exerted by the actuator Act of the control surface Gouv at the threshold value $C_{seuil}$.

The change in the setpoint angular position is temporary, so as to guarantee a maximum torque below the disengagement torque of the actuator Act. When the torque exerted by the external forces becomes lower than the torque value $C_{seuil}$ again, the autopilot module PA once again modifies the setpoint angular position so as to recover the desired trajectory.

To summarize, when the torque $C_{Act}$ measured is less than the torque value $C_{seuil}$, the actuator is regulated in terms of position and the speed of movement of the control surface Gouv is limited to a speed $v_0$, and when the torque $C_{Act}$ measured is above this torque value $C_{seuil}$, the actuator Act is regulated in terms of torque by modifying the setpoint angular position.

Figure 4:
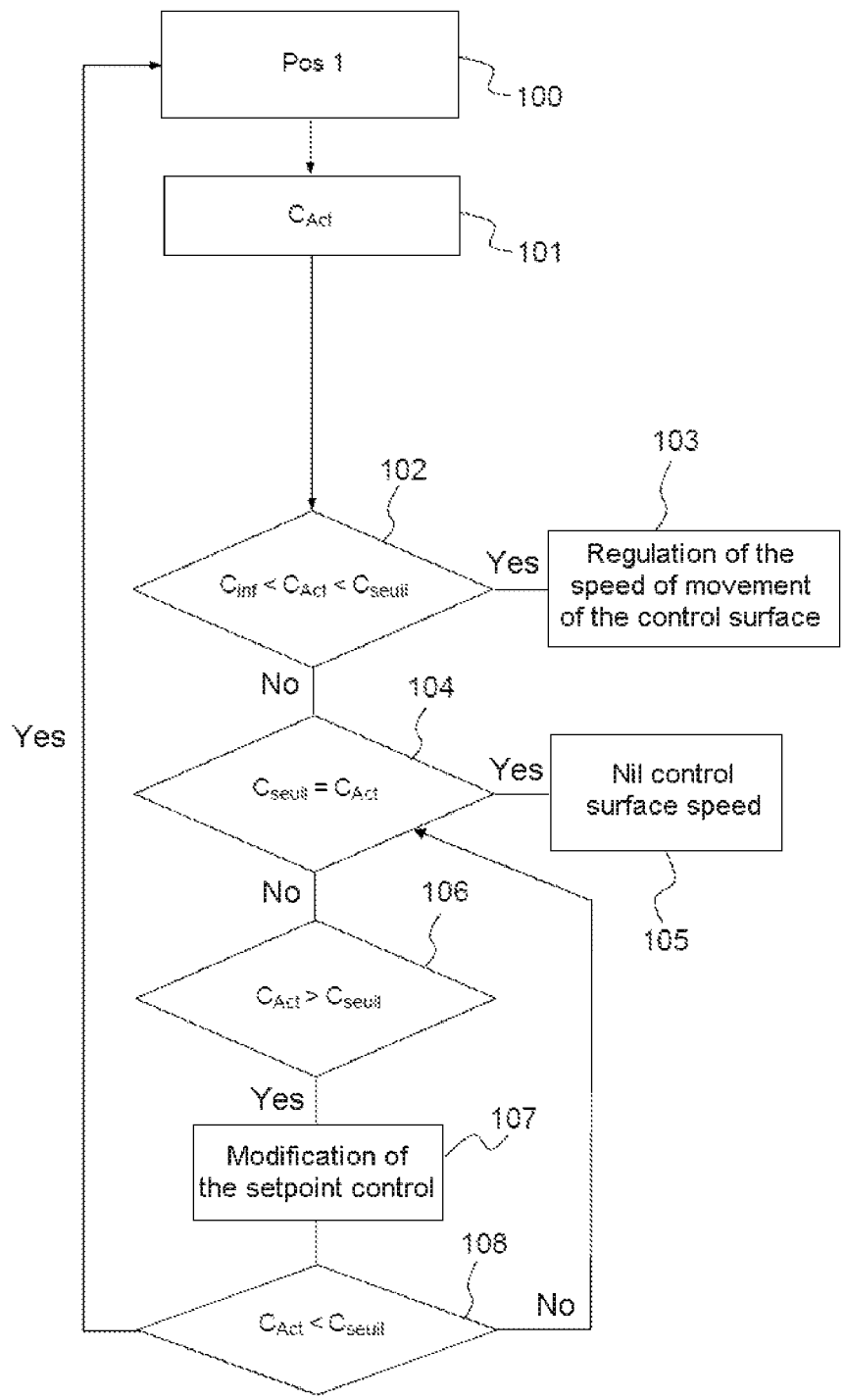
FIG. 4 shows a flowchart of the method for regulating the actuator, according to one aspect of the invention.

FIG. 4 shows a flowchart of the method for regulating an actuator Act for a control surface Gouv on an aircraft with mechanical flight control.

A first torque value $C_{inf}$ and a second torque value $C_{seuil}$ for torque exerted by the actuator Act on the control surface Gouv are determined previously, i.e. during configuration.

The aircraft notably comprises an autopilot module PA, an actuator Act comprising a control loop, a module for regulating the speed of movement of the control surface Regul and a module Capt for measuring the torque $C_{Act}$. The external forces are mainly aerodynamic forces. The torque $C_{Act}$ exerted by the actuator Act compensates for the torque $C_{Ext}$ exerted on the control surface Gouv by the external forces.

In a step 100, the autopilot module PA orders a first setpoint angular position Pos1 for the control surface Gouv. The first setpoint angular position Pos1 defines an angle difference between the direction of the control surface Gouv and a previously chosen nominal direction of the control surface.

In a step 101, the module Capt determines the torque $C_{Act}$ of the actuator Act.

A step 102 tests whether the value of the torque $C_{Act}$ lies between the first $C_{inf}$ and second $C_{seuil}$ torque values of the actuator. If the value of the torque $C_{Act}$ measured is between the first $C_{inf}$ and second $C_{seuil}$ torque values then the speed of movement of the control surface Gouv is regulated by the module Regul in a step 103. The module Regul comprises a phase lead estimator which makes it possible for it to have a prediction for the value of the useful torque, which makes it possible to obtain the information on the torque measurement early enough to allow regulation of the speed of movement of the control surface Gouv. The regulation of the speed of movement of the control surface Gouv depends on the torque $C_{Act}$. In this case, the maximum speed of movement of the control surface Gouv is decreased as the torque $C_{Act}$ increases. If the value of the torque $C_{Act}$ measured is not between the first $C_{inf}$ and the second $C_{seuil}$ torque value then a step 104 tests whether the value of the torque $C_{Act}$ exerted by the actuator Act to compensate for the torque $C_{Ext}$ exerted on the control surface Gouv by the external forces is equal to the second torque value $C_{seuil}$ of the actuator Act.

If the value of the torque $C_{Act}$ exerted by the actuator Act to compensate for the torque $C_{Ext}$ exerted on the control surface Gouv by the external forces is equal to the second torque value $C_{seuil}$ of the actuator Act, then the maximum speed of movement of the control surface Gouv is continuously decreased until a nil value is reached in a step 105.

Prolonged use of the actuator above this threshold value runs the risk of incurring the maximum torque $C_1$, which will lead to disconnection in the event of the angular setpoint not being maintained.

If the value of the torque $C_{Act}$ exerted by the actuator Act to compensate for the torque $C_{Ext}$ exerted on the control surface Gouv by the external forces is not equal to the second torque value $C_{seuil}$ of the actuator Act, then a step 106 tests whether the value of the torque $C_{Act}$ exerted by the actuator Act to compensate for the torque $C_{Ext}$ exerted on the control surface Gouv by the external forces is greater than the second torque value $C_{seuil}$ of the actuator Act.

If the value of the torque $C_{Act}$ exerted by the actuator Act to compensate the torque $C_{Ext}$ exerted on the control surface Gouv by the external forces is greater than the second torque value $C_{seuil}$ of the actuator Act, then the autopilot module PA orders a second setpoint angular position Pos2, making it possible to reduce and to maintain the torque $C_{Act}$ exerted by the actuator Act at the second torque value $C_{seuil}$ in a step 107.

The second setpoint angular position Pos2 controlled by the autopilot module PA then depends no longer on the aircraft trajectory but on the torque $C_{Act}$. In fact, the setpoint angular position Pos2 is modified in such a way as to maintain the torque $C_{Act}$ exerted by the actuator at the second torque value $C_{seuil}$ of the actuator Act.

A step 108 tests whether the value of the torque $C_{Act}$ exerted by the actuator Act to compensate for the torque $C_{Ext}$ exerted on the control surface Gouv by the external forces is less than the second torque value $C_{seuil}$.

If the value of the torque $C_{Act}$ exerted by the actuator Act to compensate for the torque $C_{Ext}$ exerted on the control surface Gouv by the external forces is less than the second torque value $C_{seuil}$ then the process begins again at step 100.

If the value of the torque $C_{Act}$ exerted by the actuator Act to compensate for the torque $C_{Ext}$ exerted on the control surface Gouv by the external forces is not less than the second torque value $C_{seuil}$ then the process begins again at step 104.

The method for regulating the actuator as described in the present application can be summarized in two main steps: a first step of position regulation when the value of the torque $C_{Act}$ exerted by the actuator Act on the control surface Gouv is less than or equal to the second value $C_{seuil}$ of the actuator Act, and a second step of torque regulation when the value of the torque $C_{Act}$ exerted by the actuator Act on the control surface Gouv is greater than the second value $C_{seuil}$ of the actuator Act.

FIG. 5 show the operating principle of a control surface actuator Act with torque regulation on an aircraft with mechanical flight control.

Figure 5A:
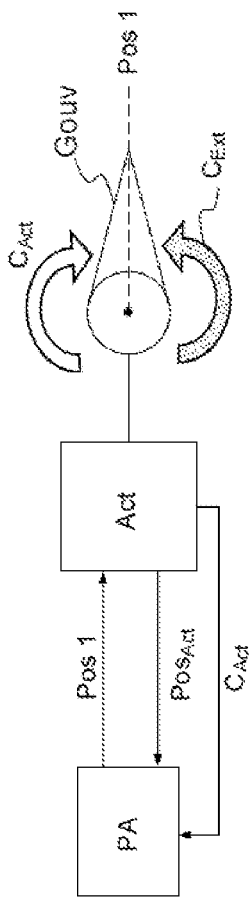
FIGS. 5A-5C show the main steps of operation of an actuator, according to one aspect of the invention.

In FIG. 5A, the autopilot module PA controls a first setpoint angular position Pos1. The control surface is then moved by an actuator Act. In this case, the first setpoint angular position Pos1 corresponds to the nominal position of the control surface. A torque $C_{Ext}$, represented by a shaded arrow in FIG. 5a, is exerted on the control surface Gouv by the external forces. The external forces may be aerodynamic or mechanical forces in the case of a limit stop or opposing forces from pilots, for example. To comply with the setpoint angular position Pos1, the actuator Act that directs the control surface Gouv exerts a torque $C_{Act}$, represented by a white arrow, which compensates for the torque $C_{Ext}$ exerted on the control surface Gouv by the external forces. In FIG. 5a, the setpoint position Pos1 is observed, in other words the value of the torque $C_{Act}$ exerted by the actuator Act is equal to the value of the torque $C_{Ext}$ exerted by the external forces.

Figure 5B:
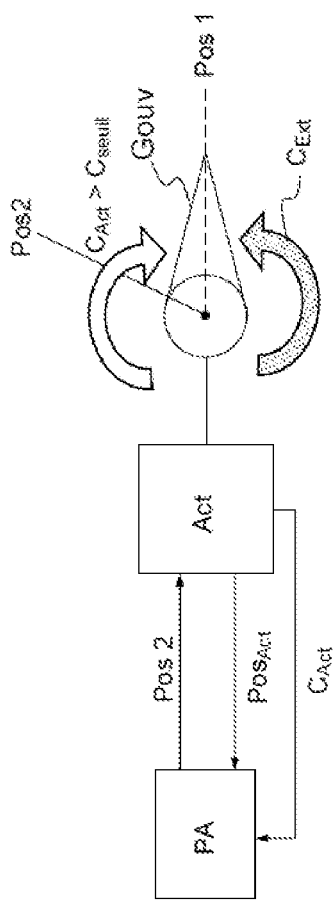

In FIG. 5B, the external forces exert a larger torque $C_{Ext}$ than previously, which is represented by a wider shaded arrow, the increase in the torque $C_{Ext}$ possibly being generated by stronger winds, for example.

To compensate for the increase in the torque $C_{Ext}$, the actuator Act generates a larger torque $C_{Act}$ until its threshold torque value $C_{seuil}$ is reached. The torque value $C_{seuil}$ corresponds to the torque value from which the torque regulation is activated.

When the actuator Act generates a torque $C_{Act}$ greater than $C_{seuil}$, the autopilot module PA controls a second setpoint angular position Pos2.

Figure 5C:
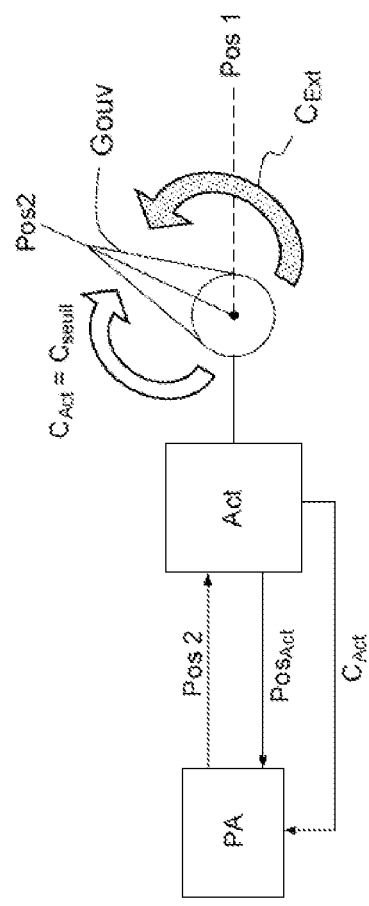

In FIG. 5C, the autopilot module PA controls a setpoint angular position Pos2 in such a way as to maintain the torque $C_{Act}$ exerted by the actuator Act at the threshold torque value $C_{seuil}$. The position of the control surface Gouv corresponds to the second setpoint angular position Pos2.

The autopilot module PA regulates the angular position setpoint in such a way as to maintain the value of the torque $C_{Act}$ exerted by the actuator Act at its maximum acceptable level, i.e. at the torque value $C_{seuil}$.

The aircraft is briefly deflected from its trajectory, which avoids the disengagement of the control surface. Once the torque $C_{Ext}$ exerted by the external forces on the control surface has returned to below the torque value $C_{seuil}$ of the actuator Act, the torque regulation of the actuator Act is deactivated.

The invention claimed is:

1. A method for regulating an actuator for a control surface, which actuator has an angular position controlled by an autopilot on an aircraft with mechanical flight control, the autopilot comprising a means for regulating the maximum speed of movement of the control surface, the method for regulating the actuator comprising:

a first step of controlling a first setpoint angular position for the control surface using the autopilot, and a second step of measuring a torque exerted by the actuator on the control surface and compensating for a torque generated by external forces on the control surface, and a third step of regulating the actuator torque, comprising the sub-steps:

testing whether the torque exerted by the actuator lies between a first torque value and a second torque value, and in that case continuously regulating the speed of movement of the control surface, testing whether the torque exerted by the actuator is equal to the second torque value, and in that case maintaining the speed of movement of the control surface at a nil value in such a way as to freeze the control surface.

2. The method as claimed in claim 1, in which the regulation of the maximum speed of movement of the control surface depends on the variations in the torque generated by the external forces.

3. The method as claimed in claim 2, in which the maximum speed of movement of the control surface decreases when the torque increases.

4. The method as claimed in claim 1, in which the third step further comprises testing whether the torque exerted by the actuator is greater than the second torque value of the actuator, and in that case modifying the setpoint angular position of the control surface in such a way as to limit the torque exerted by the actuator to the second torque value.

5. The method as claimed in claim 4, in which the third step comprises testing whether the torque exerted by the actuator is less than the second value, and in that case regulating the setpoint angular position of the control surface in such a way as to deactivate the torque limitation.

6. The method as claimed in claim 1, in which the second step further comprises reducing the measurement noise for the torque exerted by the external forces on the control surface.

* * * * *